(12) United States Patent
Peloquin et al.

(10) Patent No.: US 11,130,503 B1
(45) Date of Patent: Sep. 28, 2021

(54) HIGH-SPEED MASS TRANSPORT SYSTEM

(71) Applicant: Jean Victor Peloquin, Anaheim, CA (US)

(72) Inventors: Jean Victor Peloquin, Anaheim, CA (US); Aidan J. Bradley, Westlake Village, CA (US)

( * ) Notice: Subject to any disclaimer, the term of this patent is extended or adjusted under 35 U.S.C. 154(b) by 0 days.

(21) Appl. No.: 17/347,476

(22) Filed: Jun. 14, 2021

Related U.S. Application Data

(63) Continuation-in-part of application No. 17/135,825, filed on Dec. 28, 2020, now abandoned.

(60) Provisional application No. 62/954,351, filed on Dec. 27, 2019.

(51) Int. Cl.
*B61B 3/00* (2006.01)

(52) U.S. Cl.
CPC ..................... *B61B 3/00* (2013.01)

(58) Field of Classification Search
CPC .... B61B 3/00; B61B 3/02; B61B 3/04; B61B 1/02; B61B 13/04; B61B 13/08; B61D 15/00; B61D 47/00; B61D 35/005
See application file for complete search history.

(56) References Cited

U.S. PATENT DOCUMENTS

| | | | |
|---|---|---|---|
| 3,125,964 A * | 3/1964 | Silverman | B61B 13/04 104/89 |
| 3,233,556 A | 2/1966 | McDonald | |
| 3,254,608 A * | 6/1966 | Alden | B62D 1/26 104/295 |
| 3,444,823 A | 5/1969 | Akmentin | |
| 3,484,002 A * | 12/1969 | Barry | B61D 3/18 414/336 |
| 3,527,170 A | 9/1970 | Witmer | |
| 3,952,666 A | 4/1976 | Gladish | |
| 4,841,871 A | 6/1989 | Leibowitz | |
| 5,215,015 A | 6/1993 | Iida et al. | |
| 5,813,349 A * | 9/1998 | Jensen | B60F 1/043 104/28 |
| 6,012,396 A * | 1/2000 | Schulz | B61B 15/00 105/215.1 |
| 6,394,203 B1 | 5/2002 | Harris | |
| 7,980,335 B2 | 7/2011 | Potter | |
| 9,085,305 B2 * | 7/2015 | Pumpelly | B61B 15/00 |
| 10,322,729 B2 * | 6/2019 | Suppes | B61B 3/00 |
| 2002/0134277 A1 | 9/2002 | Illguth | |
| 2004/0244633 A1 | 12/2004 | Witmer | |
| 2005/0223934 A1 | 10/2005 | Li | |

(Continued)

FOREIGN PATENT DOCUMENTS

| CN | 102120457 | 7/2011 |
|---|---|---|
| GB | 181728 | 5/1923 |

(Continued)

*Primary Examiner* — Jason C Smith
(74) *Attorney, Agent, or Firm* — Cionca IP Law P.C.; Marin Cionca

(57) ABSTRACT

A high-speed mass transport system having a monorail track disposed along a travel path and a monorail car with a driving unit suspended from the monorail track and a commuter car selectively attached to the driving unit. The high-speed mass transport system having also having an omnidirectional wheel transporter being adapted to selectively raise and lower to engage the commuter car, thus allowing the commuter car to detach from and reattach to the driving unit.

18 Claims, 20 Drawing Sheets

(56) References Cited

U.S. PATENT DOCUMENTS

| | | | |
|---|---|---|---|
| 2011/0011298 A1* | 1/2011 | Timperman | B61B 3/02 104/91 |
| 2011/0218697 A1* | 9/2011 | Goldberg | B61B 3/02 701/19 |
| 2013/0125778 A1* | 5/2013 | LaCabe | B61B 13/00 104/130.01 |
| 2015/0329097 A1* | 11/2015 | Duran Ariza | B61B 3/02 104/23.1 |
| 2016/0009297 A1* | 1/2016 | Duran Ariza | B61B 3/02 104/23.1 |
| 2019/0236741 A1 | 8/2019 | Bowman et al. | |
| 2019/0241202 A1* | 8/2019 | Thomas | B61B 7/00 |
| 2019/0256110 A1* | 8/2019 | Suarez Ajo | B61B 1/02 |

FOREIGN PATENT DOCUMENTS

| | | |
|---|---|---|
| GB | 995127 | 6/1965 |
| GB | 1334598 | 10/1973 |
| GB | 1334874 | 10/1973 |
| GB | 1399459 | 7/1975 |
| KR | 101319045 | 10/2013 |
| WO | 2012061995 | 5/2012 |
| WO | 2017145189 | 8/2017 |

\* cited by examiner

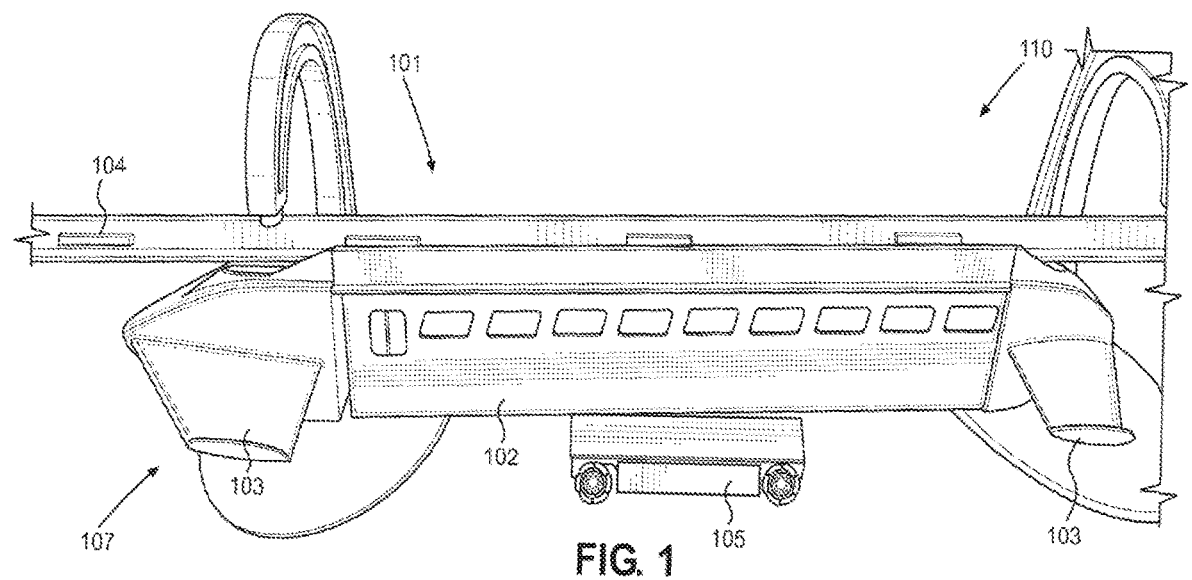

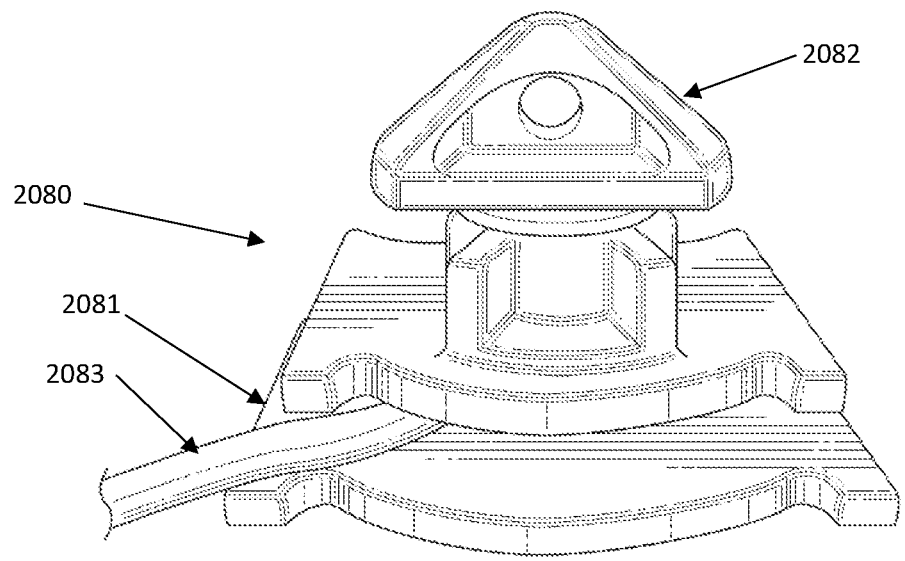
FIG. 20A - Prior Art
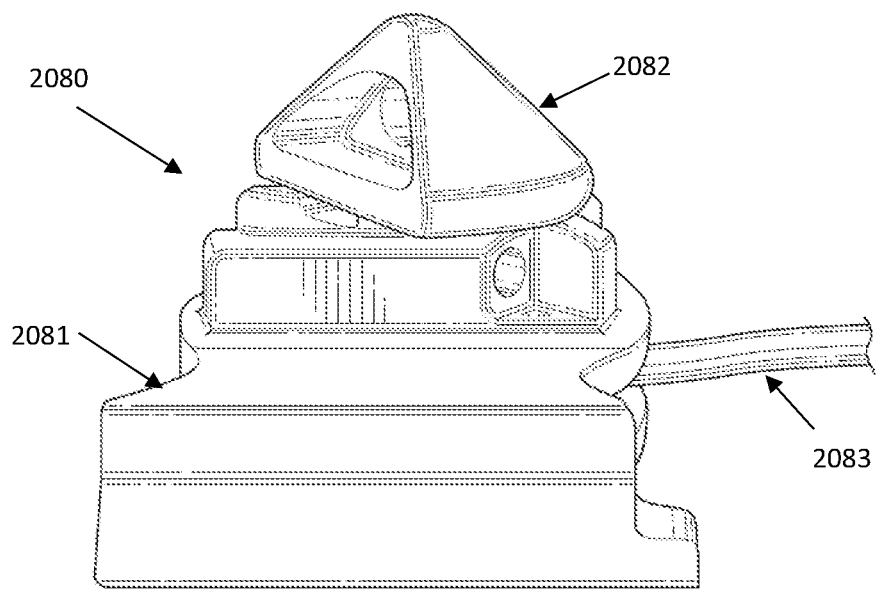
FIG. 20B - Prior Art

HIGH-SPEED MASS TRANSPORT SYSTEM

CROSS-REFERENCE TO RELATED APPLICATIONS

This application is a continuation-in-part application of U.S. Non-Provisional application Ser. No. 17/135,825, filed Dec. 28, 2020, which claims the benefit of U.S. Provisional Application No. 62/954,351, filed Dec. 27, 2019, which are hereby incorporated by reference, to the extent that they are not conflicting with the present application.

BACKGROUND OF INVENTION

1. Field of the Invention

The invention relates generally to transportation, and more specifically to high-speed mass transportation.

2. Description of the Related Art

Currently, mass transportation is an ongoing issue because of the world's growing population. The existing rapid transport methods are not sufficient for the amount of people presently commuting because of their lack of ability to bring passengers near their desired location in a timely manner. Expanding current transportation methods would mean widening freeways, adding carpool lanes, increasing the number of buses on the road, widening city streets, and adding light rails, which are all costly and not long-term solutions. Most of these short-term solutions also add to the current pollution problem due to the carbon emissions they produce. These methods are also time inefficient because of the time sitting in traffic and the time it takes to load and unload passengers from the public transport vehicle.

Additionally, living in city centers, where there is a high job density, has led to the increased cost of living in these urban areas. Thus, commuting is a significant part of the daily life for most people. Furthermore, current rapid transportation does not allow people to live significant distances away from work because of the time the commute may take. The long commute is usually due to either traffic, driving to work or to a station, or the transport system having multiple stops. Passengers would then also need transport from the transportation system's stop to their place of employment. These methods are also typically late and do not run on time making them unreliable for passengers to get to work on time.

Typically, bullet trains and magnetic levitation trains are ground based systems. This means a lot of surface area needs to be cleared for the tracks, and when roadways cross theses high-speed track, they must go under or over the track. This is another issue for trying to implement this system in a developed city because the roads are already positioned. In addition, the precision of the high-speed track on the ground must be very accurate to ensure the train is balanced on the tracks, to for example compensate for the centrifugal force during a turn. These are very expensive to construct in a developed city, if it is even possible with the city's infrastructure.

Therefore, there is a need to solve the problems described above by proving a more efficient system for high-speed mass transportation.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description.

In an aspect, a high-speed mass transportation system is provided, the system having modular parts for the driving mechanism, passenger portion, and cargo containers. The high-speed mass transportation vehicle being modular for more time efficient passenger and cargo loading and unloading. The modular nature of the monorail car allows the propulsion unit to always stay connected to the overhead monorail, while the passenger portion disconnects and docks into the docking station for loading and unloading. Thus, an advantage is more efficient transportation because the propulsion unit does not wait for passenger loading and unloading.

In another aspect, a high-speed mass transportation system is provided, the system being autonomous and having omnidirectional wheels for the commuter car and the omnidirectional cargo transporter. The commuter car of the mass transportation system is autonomous and has omnidirectional capabilities, by using omnidirectional wheels, for guiding the passenger unit to the correct docking station. The passenger portion also contains cargo units, which are also autonomous and have omnidirectional capabilities by using omnidirectional wheels. The omnidirectional wheels for both the commuter car and the omnidirectional cargo transporter permit horizontal movement which reduces space needed and can turn to unload when needed. Thus, an advantage is more efficient transportation because the system may always depart and arrive at the scheduled time. Another advantage is the units having the ability to navigate the docking station with ease autonomously.

In another aspect, a high-speed mass transportation system is provided, the system being suspended on an overhead monorail. The autonomous mass transportation system may use a magnetic levitation propulsion system, an air cushion propulsion system, or a combination thereof. The overhead suspension allows the monorail cars to not interfere with existing modes of transportation. The monorail car of the high-speed mass transportation system is also provided having wings. The wings would stabilize the monorail car during high speeds and higher, above-ground altitudes. Thus, an advantage is being above traffic that might disrupt the monorail. Some advantages of the magnetic levitation are less noise pollution, no smog pollution, and higher capable speeds. Another advantage of the high-speed mass transportation system would be additional lift and stability due to the wings.

In another aspect, a high-speed mass transportation system is provided, the system having a monorail track and a station disposed along a travel path, wherein the monorail track intersects the station. The high-speed mass transportation system also having a monorail car with a driving unit adapted to suspend from the monorail track and a commuter car having a main cabin for housing passengers is provided. Additionally, the high-speed mass transportation system has an omnidirectional wheel transporter being adapted to selectively raise and lower to engage the commuter car, thus allowing the commuter car to detach from and reattach to the driving unit. An advantage of the high-speed mass transportation system being high-speed transportation and increased efficiency due to the commuter car separating from the driving unit. The separation of the commuter car from the driving unit allows commuter cars to be loaded and unloaded without interrupting other commuter car travel.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1 illustrates the side perspective view of monorail car attached to the monorail track, according to an aspect.

FIGS. 20A-B illustrate prior art shipping container locking mechanisms in unlocked and locked state, respectively.

DETAILED DESCRIPTION

Figure 2A:
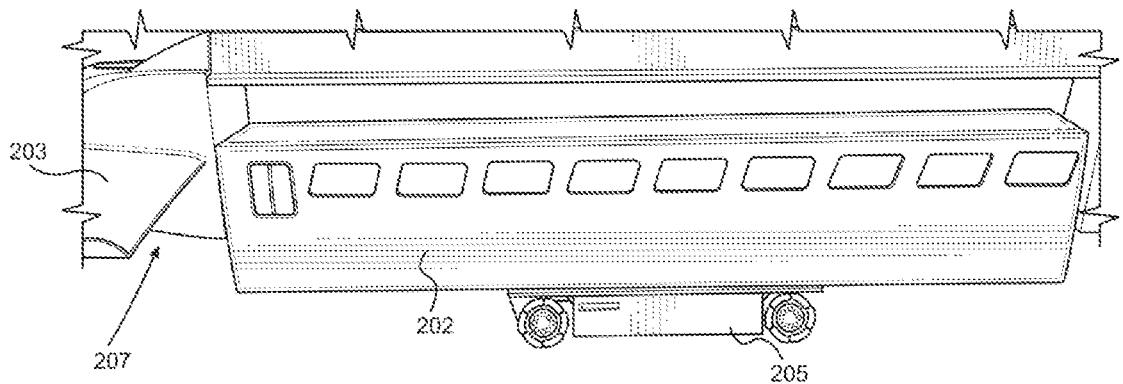
FIG. 2A illustrates a side perspective view of a commuter car detached from the driving unit and in the process of being removed by an omnidirectional cargo transporter from the driving unit, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

Figure 4:
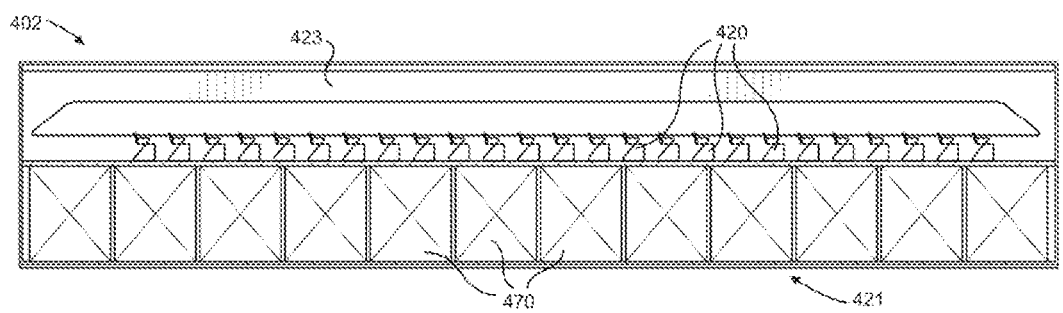
FIG. 4 illustrates the side cross section view of a commuter car, according to an aspect.

FIG. 1 illustrates the side view of a monorail car 101 attached to the monorail track 104, according to an aspect. A high-speed mass transport system 110 may have the monorail car 101 and the monorail track 104, which may be attached to allow the monorail car 101 to travel along the monorail track 104. The monorail car 101 may be modular and may have a driving unit 107 and a commuter car 102. Additionally, the commuter car 102 may have a main passenger cabin and a cargo bay, as shown in FIG. 4 and as it will be described when referring to FIG. 4. The monorail track 104 may be suspended above the monorail car 101, which allows for suspended transportation. Moreover, having a monorail track not on ground level may allow for current transportation on the ground to be uninterrupted. Other mass transportation systems, such as subways or trains require significant construction to the current city's infrastructure, which causes an increase in traffic. These modes of transportation also hinder current travel means because of traffic cross sections and other surface terrain obstacles. The suspended track may allow for continuous travel without interfering with other current means of travel.

In an example, the suspended track may allow the monorail car 101 to not be affected by freeway interchanges, utility wires and cables, train crossings, trees or other surface obstacles. Meaning whenever necessary, the monorail car 101 may travel as low as 50 feet above the ground and as high as 1000 feet above the terrain to avoid the numerous interfering obstacles. The monorail car 101 may reach these high altitudes by continuously increasing the slope of the monorail track 104. Thus, mountain passes may not be a problem because the suspended track allows the monorail car to travel high above uneven terrain and may follow the shape of the mountain pass. Typical weather conditions also may not be a problem because of the stability the wings 103 provide, which will be discussed in more details when referring to FIGS. 3A and 3B.

The high-speed mass transport system 110 also may travel autonomously, which may eliminate the need for a driver, a conductor, or attendants. Additionally, the high-speed mass transport system 110 may be monitored from a control center, which may allow the system to depart on time and arrive on time. In addition to passenger seating, the commuter car 102 may have cargo space below the main passenger cabin for the transportation of parcels and cargo, thus providing an additional revenue source. Moreover, the monorail cars 101 may glide silently above the congestion of conventional transportation because of the suspended track and a magnetic levitation propulsion system. For example, the monorail car 101 may be 96-foot long and may have seating for 100 passengers.

For example, the high-speed mass transport system 110 may utilize a magnetic levitation (or "maglev") system for its primary propulsion method. The magnetic levitation system does not produce the pollution other transportation methods produce. Magnetic levitation utilizes magnets to suspend the monorail car 101 from the monorail track 104 and then uses a series of alternating magnetic poles to pull the monorail car forward. This may allow the system to be a clean energy system, while also limiting noise pollution other mass transportation systems create. In another example, the autonomous mass transportation system may use a magnetic levitation propulsion system, an air cushion propulsion system, or a combination thereof.

Additionally, the monorail track 104 may be supported by, for example, a cable-stay construction, which is a series of cables connected to towers that support the track. In another example, the monorail track 104 may be supported by an arch-bridge construction, which is arch above the track with cables supporting each section of the track. The high-speed mass transport system 110 may have a monorail track 104 in each direction suspended, for example, by a plurality of concrete "T" pylons spaced ½ mile apart. Additionally, a switching mechanism, not shown, may allow for the high-speed monorail cars 101 to exit the high-speed glide rail and enter specific city center or suburban stations. These high-speed mass transport system stations may be located near city centers, airports, train stations, government buildings, large shopping centers, universities, and large employer complexes. The high-speed capabilities of the high-speed mass transport system 110 may allow passengers to work and live up to 200 miles apart.

The monorail track 104 may utilize switching mechanisms to alternate between various tracks, allowing the high-speed mass transport system 110 to not be a single track with a single destination. This may allow for a higher volume of passengers transported and may allow for passenger stops closer to city centers. The monorail car 101 having the capability to reach city centers may allow for passengers to reach their desired destination rather than having to find another mode of transportation after departing from the monorail car 101.

The monorail car 101 may also be autonomous, meaning there would be no need for employed navigation personnel to be on board the monorail. The autonomous nature of the monorail system may also allow for the system to be more accurate with arrival and departure times. This may also limit overall costs of the system along with allowing for more space for passengers aboard. The high-speed mass transport system 110, shown in FIG. 1, has a monorail 104 with a monorail car 101 attached. The monorail car 101 having two components, the driving unit 107 and the commuter car as it will be discussed in more detail in reference to FIG. 2. The commuter car having a passenger cabin and a cargo bay. The cargo bay may contain autonomous omnidirectional cargo transporters that may leave the cargo bay of the commuter car to their desired destination. For example, the cargo bay may be used to transport commercial packages and would load them directly onto delivery trucks.

Having a single rail, for example, as the monorail track 104 may allow for less costly construction compared to other track configurations. Thus, other track configurations may work for the high-speed mass transport system 110, but the suspended monorail may be the most cost effective. Utilizing a suspended track may also be less costly to construct because an on-the-ground track may require more precision during construction, which would cost more. The more precision is needed due to the balance required for the vehicle to function properly on an on-the-ground track at high speeds. Magnetic levitation propulsion systems have been tested and proven reliable and safe and are known for their high-speed capability. The magnetic levitation propulsion system is also known for reaching higher speeds compared to other mass transportation methods. For example, maglev rail system in Japan has achieved 400 mph, while the United States Air Force set a maglev speed record of 633 mph.

As described herein, the high-speed mass transport system ("system," "transport system") 110 may have a plurality of pylons 130 disposed on a travel path between a plurality of destinations. For example, the destinations may be places such as Los Angeles and Las Vegas and the travel path being the route the monorail car 101 may travel to get from Los Angeles to Las Vegas. The monorail track 104 being attached to and suspended from the plurality of pylons 130 and being positioned along the travel path. A plurality of stations disposed along the travel path, wherein the monorail track 104 intersects each of plurality of stations, which will be described in more detail when referring to FIGS. 7 and 8. The monorail car 101 having a driving unit suspended from the monorail track 104 and adapted to propel using magnetic levitation and a commuter car 102 selectively attached to the driving unit 107 is described herein. The commuter car 102 may have a cargo compartment having an omnidirectional cargo transporter adapted to transport passenger cargo to a station cargo bay and a main cabin being adapted to house passengers, which will be described in more detail when referring to FIG. 6. The monorail car 101 may also have a pair of exterior wings ("wings")103 disposed on an exterior surface of the monorail car. Furthermore, the system 110 may have an omnidirectional wheel transporter 105 being adapted to selectively raise and lower to engage the commuter car 102, thus allowing the commuter car 102 to detach from and reattach to the driving unit 107. Thus, allowing the monorail car to transport the passengers from each of the plurality of stations. Moreover, the high-speed mass transport system 110 may be autonomous to further allow for time efficient high-speed mass transportation.

Figure 2B:
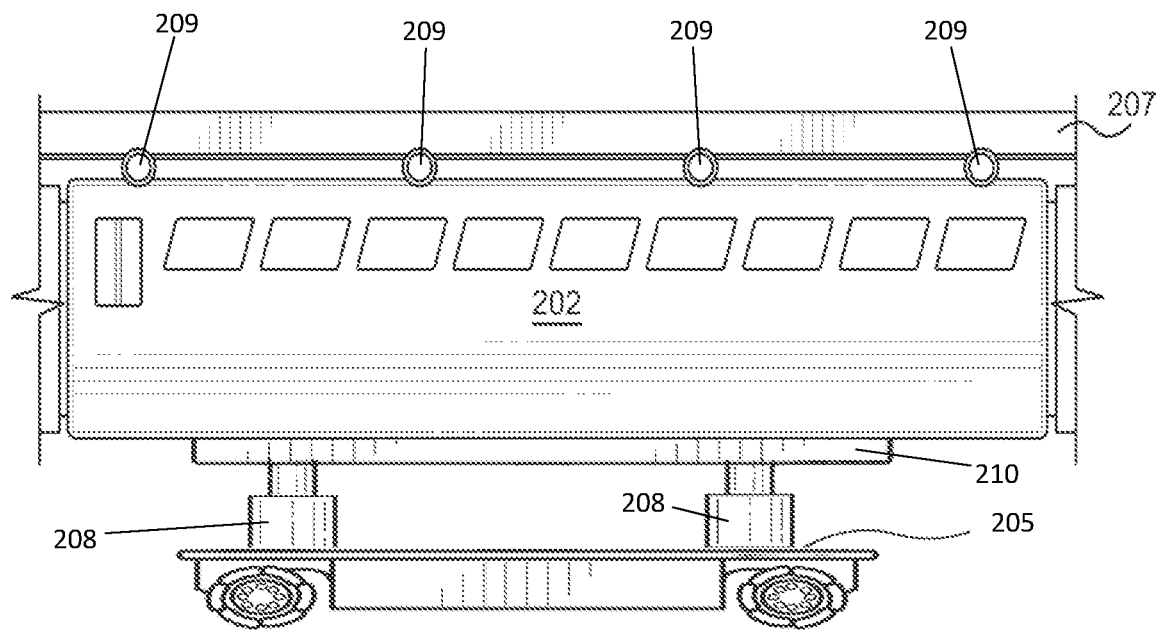
FIG. 2B illustrates a side view of a commuter car being lifted up by an omnidirectional cargo transporter and being attached to the driving unit, according to an aspect.

FIG. 2A illustrates a side perspective view of a commuter car detached from the driving unit and in the process of being removed by an omnidirectional cargo transporter from the driving unit, according to an aspect. The commuter car 202 may be removed from the driving unit 207 by an omnidirectional wheel transporter 205, which may lift up its load plate 210 (as shown in FIG. 2B) to allow for disengagement of the commuter car 202 from the driving unit 207, by unlocking the locking mechanisms 209 (shown in FIG. 2B), once the load plate 210 touches the bottom of commuter car 202 (as shown in FIG. 2B) and is thus ready to support the load of the commuter car 202. Next, the telescoping lift system 208 (see FIG. 2B) is lowered and thus the commuter car 202 is lowered as shown in FIG. 2A. Next, the omnidirectional wheel transporter 205 moves the commuter car 202 away from the driving unit, to the station. The omnidirectional wheel transporter 205 may also be autonomous, such as the Kuka omniMove™ transport platform. The driving unit 207 would preferably have wings 203 to help stabilize the commuter car 202 and driving unit 207 when traveling at high speeds, which will be discussed in more detail hereinafter, in reference to FIGS. 3A and 3B.

FIG. 2B illustrates a side view of a commuter car being lifted up by an omnidirectional cargo transporter and being attached to the driving unit, according to an aspect. When the omnidirectional cargo transporter 205 returns the commuter car 202 to the driving unit 207 for attachment thereto, the omnidirectional cargo transporter 207 with the commuter car 202 on it would be positioned, or would position itself if automatic, below the driving unit 207, as shown in FIG. 2A. Next, as shown in FIG. 2B, the omnidirectional cargo transporter 205 would expand its telescopic lift system 208 high enough, such that the locking mechanisms 209 can be engaged, thus securely attaching the commuter car 202 to the driving unit 207, for high-speed transportation. As shown in FIG. 2B, eight attachment points, four on each side, may be provided, each attachment point having a locking mechanism 209.

Figure 2C:
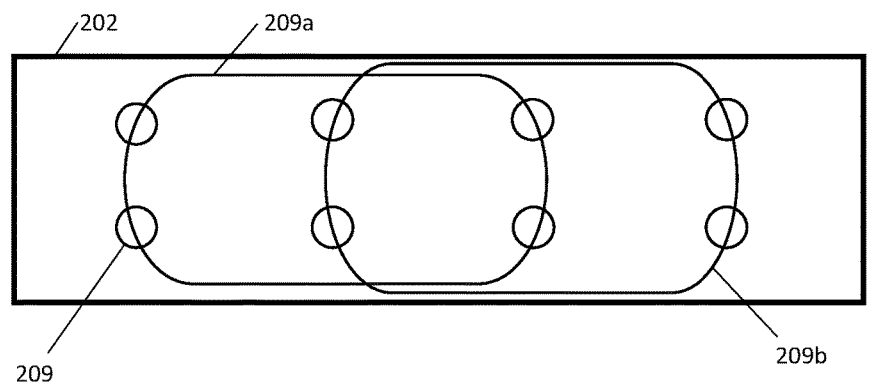
FIG. 2C is a diagram showing an approach for redundant coupling of the commuter car to the driving unit.

As shown in FIG. 2C, the eight locking mechanisms 209 may be grouped in two independent sets of four, that can be independently engaged by their own actuating system 209a and 209b. Because of their distribution, as shown in FIG. 2C, each of the sets of four locks can independently and safely attach the commuter car 202 to the driving unit 207. However, this approach provides redundancy and thus an additional level of safety, since it is highly unlikely for actuating systems 209a-b to fail at the same time.

In an example, the locking mechanisms 209 may be similar to the locking mechanism 2080 shown in FIGS. 20A-B, that are used in the shipping industry to connect containers to trucks or containers to each other. Here, in an example, the lock base 2081 could be permanently attached to the top of the commuter car 202, and when the commuter car 202 is lifted up as shown in FIG. 2B, the lock head 2082 could be caused to be inserted in an opening (not shown) in the driving unit 207 and the locking mechanism 2080 could be locked in by the lock head 2082 being rotated as shown in FIG. 20B. The lock head 2082 rotation could be accomplished by drivingly engaging an electrical motor with lever 2083 or directly with the pivot (not shown) of the lock head 2082 that allows its rotation. Preferably, the rotation of the locking head 2082 is automated via an automatic actuating system 209a or 209b. It should be understood that driving engagement can be accomplished for example by gears, rods, etc., and that an automated actuating systems 209a-b would comprise sensors, controllers, and the like, as known in the art.

The high-speed mass transport system may utilize a central control center to run the autonomous aspects of the system. The central control center may be located at an off-site location, which may not physically interact with the high-speed mass transport system. The central control center may be used to control all the basic functions of the high-speed mass transport system and to ensure the system is running properly. Furthermore, the high-speed mass transport system may be computer-controlled, thus departure and arrival times may not be altered. This technology is already available, and these types of control centers are used throughout the world, such control centers include NASA, U.S. government drone facilities, all space launch facilities, trains, subways, planes, and many thousand more throughout the world. Software for autonomous guidance already exists and may be purchased off-the-shelf, which may be adapted for the high-speed mass transport system's needs.

The removable commuter car 202 also may allow for faster loading and unloading of passengers and cargo. The increased speed of loading and unloading is due to the ability to load a commuter car 202 while another commuter car 202 attached to the driving unit 207 is still moving. Thus, the monorail car may stop to disengage the current full commuter car 202, move forward and engage with another full commuter car 202. This allows for the unloading and loading of passengers and cargo to be removed from the total time of travel of the monorail car. Moreover, the travel time would only consist of the time it would take to disengage and engage a commuter car 202. The process of loading and unloading passengers and cargo will be discussed in more detail in reference to FIG. 7.

Figure 3A:
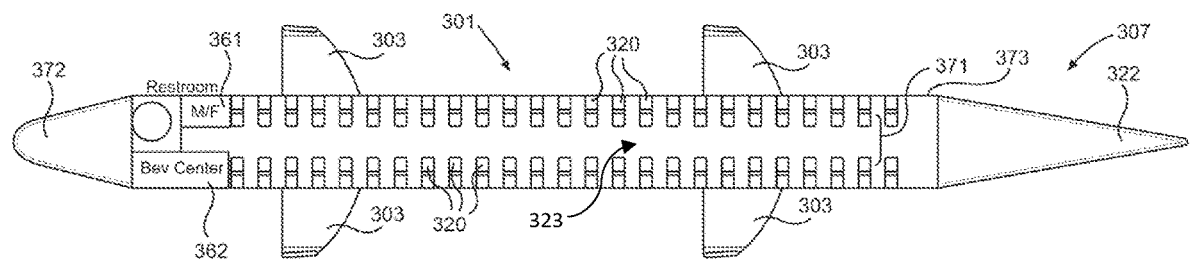
FIG. 3A illustrates the top cross section view of a monorail car, according to an aspect.

FIG. 3A illustrates the top cross section view of a monorail car 301, according to an aspect. In an example, the commuter car may have a two-seat configuration on each side, 25 seats per row, 4 rows, with a total of 100 passengers. The commuter car may also have other configurations for passenger and restroom layouts. The main cabin 323 may also have other amenities, such as comfortable semi-reclining seats, leg room, free WIFI, and a state-of-the-art entertainment console, similar to what is found on current airplanes. Additionally, the center aisle may be ADA compliant, for example, being wide and spacious allowing handicapped accessibility to the automated refreshment center and accessible restrooms.

Dimensions of the monorail car 301 may be discussed herein, but it should be noted that all the dimensions described herein are used as an example. It should also be understood that deviation from those dimensions can be made and still stay in the spirit and scoop of the invention. For example, the total length of the monorail car 301 may be 100'-10" is used as an example to account for the 100 passengers and their belongings. The monorail car also may have two sets of wings each with a wingspan of 29'-3" for example, and a wing root chord length of 10' for example. The distance between the two sets of wings 303 may be 40'-10", as an example. For example, the nose 322 of the monorail car may have a length of 30' and the rear 372 may have a length of 15'. Additionally, the commuter car 302 may have a length of 100'-10" and a width of 11' for example. The distance of the aisle 371 between the passenger seats 320, 520, 620 may be 32" as an example. The monorail car is also shown having its exit 373 near the nose 322 of the car and the restrooms 361, both regular and wheelchair accessible, and beverages 362 near the rear end 372 of the car.

Figure 3B:
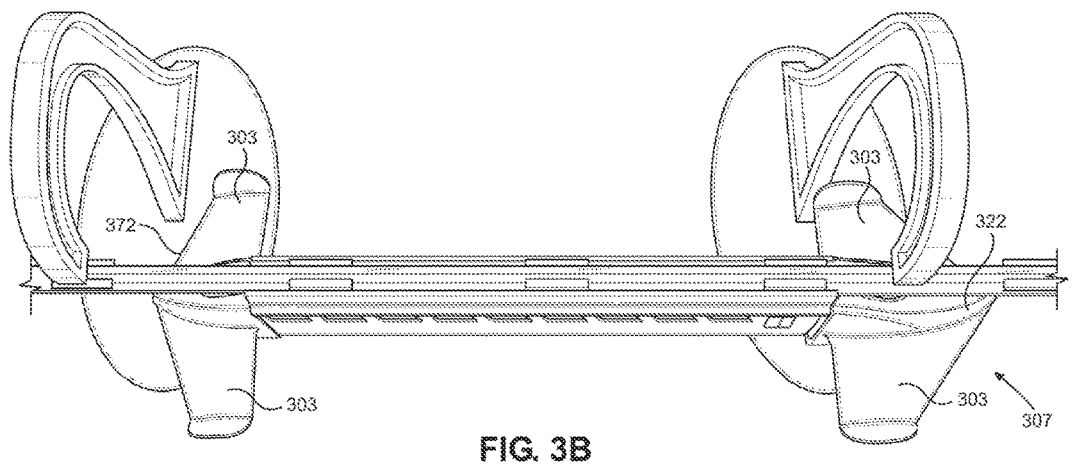
FIG. 3B illustrates the top perspective view of a monorail car, according to an aspect.

As mentioned herein and shown in FIGS. 3A and 3B the monorail car 301 may have stabilization wings ("wings," "monorail car wings," "stabilization wings") 303. The monorail car wings 303 may allow for more stabilization during travel and add lift while traveling at high speeds. Moreover, the stabilizing wings 303 may provide aerodynamic lift to the monorail car while moving due to the airflow traveling underneath the wings 303, which in turn causes an increase of pressure to create the lift. The additional lift may alleviate the weight of the monorail car and assist with the magnetic levitation. Having additional lift in the system means the magnetic levitation may not need to be at full power for the entire trip, which conserves energy. Magnetic levitation may also be used because of the lack of friction due to the levitation. Additionally, the lack of friction may allow for the higher speeds described herein. Moreover, magnetic levitation also may be advantageous in varying environments and weather because it is an electromagnetic system meaning the monorail hovers above the rail due to the opposing magnets on both the monorail car and rail. Thus, if there is buildup of snow or debris on rail it does not interfere with the monorail car's high-speed travel.

The exterior of the monorail car may also be aerodynamically formed to further improve speed and stability. The nose 322 of the monorail car 301 may be attached to the driving unit 307 and may be shaped conically to help air flow along the surfaces of the monorail car 301, instead of hindering the airflow by coming into contact with a large flat surface.

In another example, air may be pumped into the space between the rail and the monorail car to facilitate the levitation. The pumped air may provide an air cushion, which may create a near frictionless connection for moving. The high-speed mass transport system may use the air cushion in conjunction with the magnetic levitation for propulsion purposes.

FIG. 3B illustrates the top view of a monorail car 301, according to an aspect. As shown, the wings 303 may positioned towards the front and rear end of the driving unit compared to how they are positioned in FIG. 3A. Shown in both FIG. 3A and FIG. 3B, the wings 303 are attached to the driving unit 307; however, the wings 303 may be placed on the commuter car as an alternative. The nose may vary in the sharpness of the conical shape, the difference in shape is shown in FIG. 3A and FIG. 3B. The nose 322 may be shaped differently due to the aerodynamic properties of the system. For example, the driving unit may have an aerodynamic nose coupled to an exterior front end. The nose 322 and the wings 303 may be used to improve aerodynamic prosperities and reduce drag. The nose 322 and the wings 303 may be complementary parts, meaning the placement of the wings 303 may influence the shape and sharpness of the nose 322. The overall objective of the wing 303, 503 placement and the nose 322 shape are increased stability and improved aerodynamic properties.

FIG. 4 illustrates the side cross section view of a commuter car 402, according to an aspect. As shown in FIG. 4, the cargo bay 421 may be positioned below the passenger cabin 423. The layered compartments may coincide with the docking station, which will be discussed in more detail in reference to FIG. 6. Dimensions of the commuter car 402 may be discussed herein, but it should be noted that all the dimensions described herein are used as an example. It should also be understood that deviation from those dimensions can be made and still stay in the spirit and scoop of the invention. For example, the length of the commuter car 402 may be 100'-10" with a total height of 20'. The height of the main passenger cabin 423 may be 9'-3.5" and the height of the cargo bay 421 may be 9'. For example, the main passenger cabin 423 and the cargo bay 421 may be the entire length of the commuter car 402. The cargo containers 470 within the cargo bay 421 are shown to have a height of 8'-10" and a width of 7'-6". The space between the cargo containers 470 is illustrated as 9.375". The main passenger cabin 423 may also have a single long window, as shown, which may be 97'-5" long and 3'-4" tall.

Figure 5:
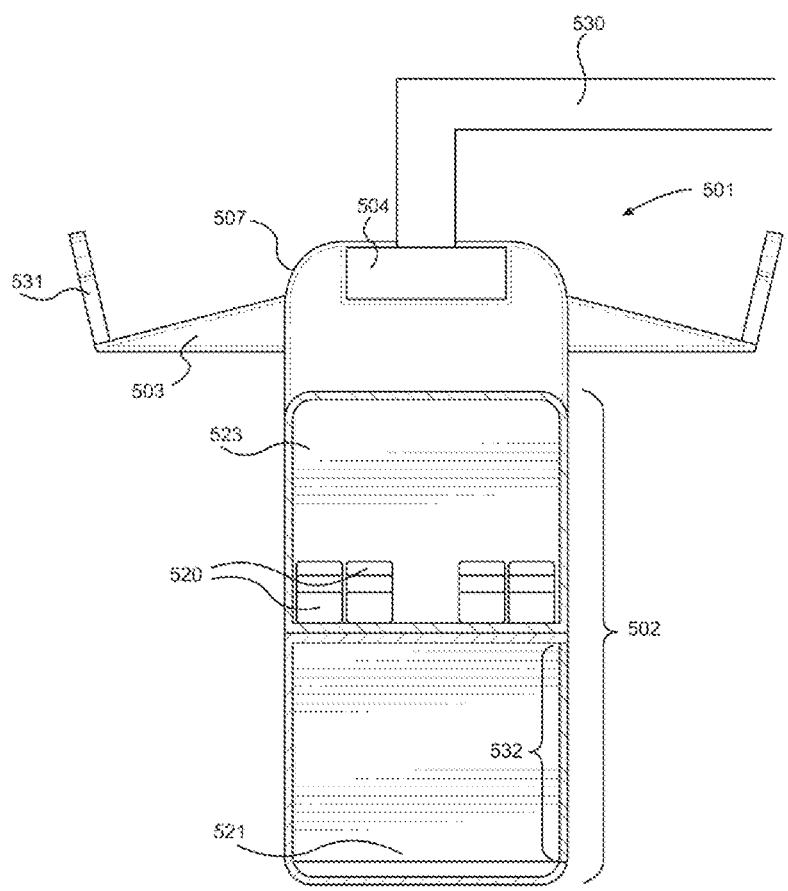
FIG. 5 illustrates the front cross section view of a monorail car, according to an aspect.

FIG. 5 illustrates the front cross section view of a monorail car 501, according to an aspect. As shown in FIG. 5, the cargo bay 521 may be positioned below the passenger cabin 523. Shown above the main passenger cabin 523 is the driving unit 507, which as described herein would provide the propulsion to the monorail car 501. The driving unit 507 may be engaged with the monorail track 504 to allow the monorail car to be suspended over ground level. The driving unit 507 and the monorail track 504 may always be engaged to allow for a faster travel time. The driving unit 507 may engage with a loaded commuter car at each location to not waste time for the loading and unloading of passengers at each destination. This may allow the commuter car 502 to be loaded while the driving unit is reaching that destination. Thus, by the time the driving unit reaches that destination the commuter car 502 would be loaded and ready for travel.

Dimensions of the monorail car 501 may be discussed herein, but it should be noted that all the dimensions described herein are used as an example. It should also be understood that deviation from those dimensions can be made and still stay in the spirit and scoop of the invention. For example, the height from the tip of the wing tip 531 to the bottom of the monorail car 501 may be 26'-7". The cargo bay opening 532 may be 9', as an example. The width of the cargo bay 521 may be 10', as an example.

In an example, the high-speed mass transport system may have a monorail track 504 in each travel direction described herein, which may further allow for traffic in both directions. The high-speed mass transport system may have a central support pillar 530 spaced along the track path ("travel path") as needed. For example, the system may have a monorail track 104 in each direction suspended by a concrete "T" pylon spaces ½ mile apart as described herein. The pillar may support the suspended track 504 at all critical support locations to insure structural stability. Facing the opposite direction, the configuration may be mirrored to allow for monorail car traffic to be flowing in both directions. This configuration may allow for two-way traffic instead of having a one-way system that may need to reach its destination before heading in the opposite direction.

The monorail track 504 may also have switching mechanisms on the main high-speed glide rail to allow for more possible destinations. For example, there may be a main high-speed glide rail from Las Vegas to Los Angeles, but to provide more destination options there may be switching mechanisms and other monorail tracks branching outward towards other destinations. As an example, when the main high-speed glide rail is nearing Los Angeles a switching mechanism may engage and lead the monorail car to other tracks with destinations such as San Diego, Irvine, or San Francisco.

Figure 6:
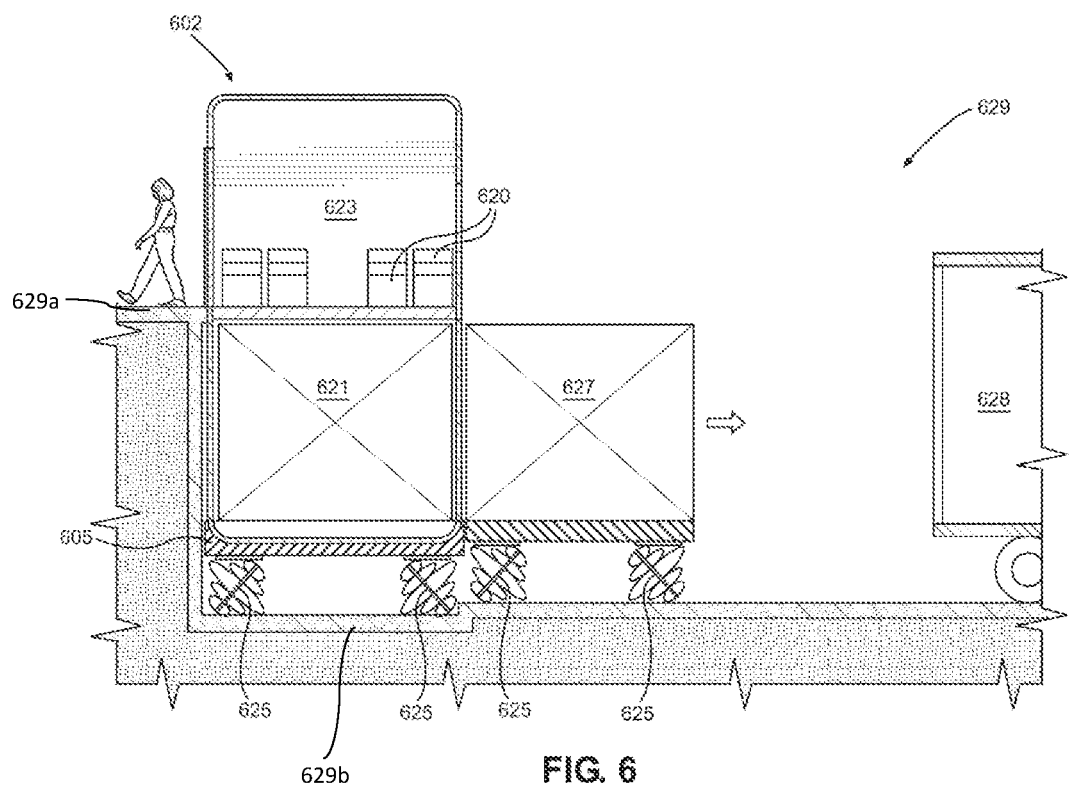
FIG. 6 illustrates the front cross section view of a commuter car docked and unloading, according to an aspect.

FIG. 6 illustrates the front cross section view of a monorail car docked and unloading, according to an aspect. As shown in FIG. 6, the commuter car 602 may be docked at a duel leveled docking station 629. The duel leveled docking station may allow for passengers to exit the upper-level main cabin 623 onto a first level 629a, while cargo 627 is removed from the lower cargo bay 621 onto a second level 629b. The cargo 627 may then be loaded onto parcel delivery trucks 628 to be led to their desired location. The omnidirectional wheel transporter 605, as mentioned herein, may disengage the commuter car 602 from the driving unit and lower into the docking station. The passengers may then exit the main cabin 623, while cargo may also be removed from the commuter car 602. During this unloading process the driving unit may move forward and may have a second loaded commuter car lifted into an engaged position by a second omnidirectional wheel transporter 605. Once the loaded commuter car 605 is engaged the monorail car may continue to the next docking station. After the loaded commuter car 605 has left the docking station, the unloaded commuter car attached to the omnidirectional wheel transporter 605 may move forward in the docking station to load passengers for the next driving unit 607. The commuter car 602 may have an omnidirectional wheel transporter 605 with omnidirectional wheels 625. The omnidirectional wheel transporter 605 may engage with the commuter car 602 to transport it to the necessary destination.

Figure 7:
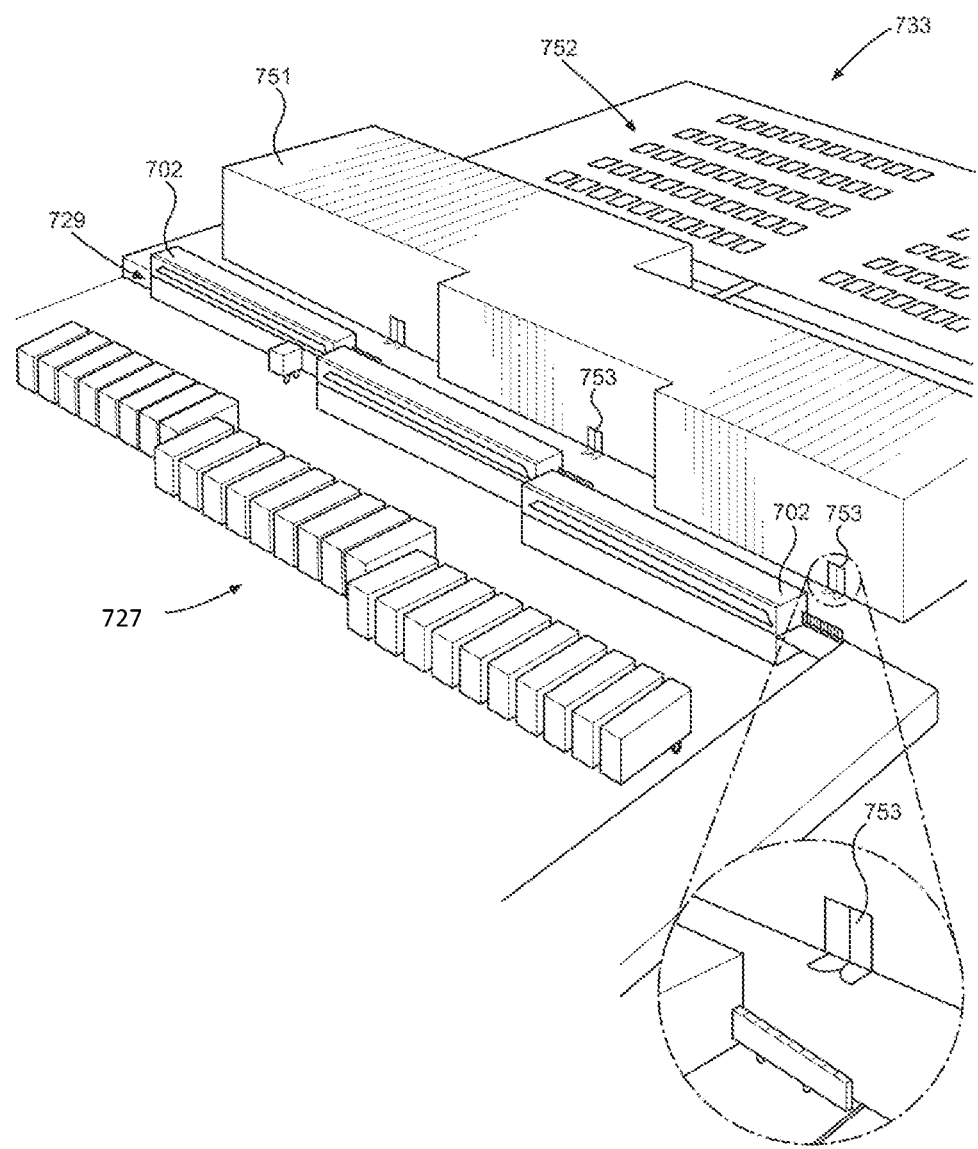
FIG. 7 illustrates the isometric view of a high-speed mass transport system station, according to an aspect.
Figure 8:
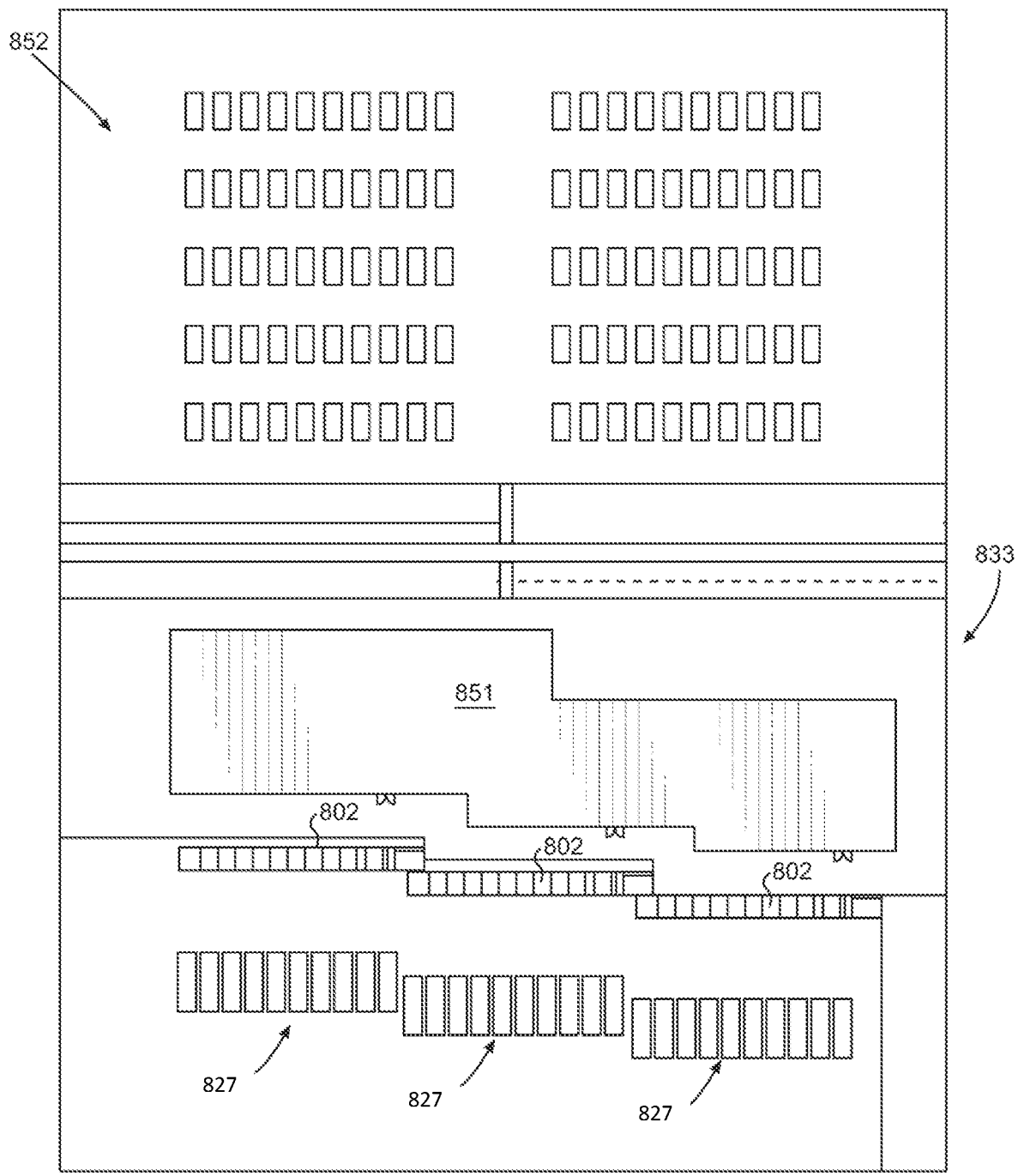
FIG. 8 illustrates the top view of a high-speed mass transport system station, according to an aspect.

FIG. 7 illustrates the isometric view of the high-speed mass transport system station, according to an aspect, while FIG. 8 illustrates the top view of the high-speed mass transport system station. As shown in FIG. 7 and FIG. 8, the transport system station 733, 833 may have three docking stations. The transport system station 733, 833 may have a parking lot 752, multiple docking stations 729, and a station building 751, 851. The station building may have entrances 753, as shown, to allow the passengers to the loading areas. The parking lot 752, 852 may allow for passengers to park their personal vehicles prior to boarding the monorail car. The capacity for multiple commuter cars 702, 802 may allow for a more efficient system because a commuter car 702, 802 may be already loaded and ready for travel while the current car is being unloaded. Additionally, the transport system station 733, 833 may have a plurality of cargo 727, 827 with omnidirectional cargo transporters, for example, to allow easier transport onto various delivery trucks.

In an example, the monorail car may come into the transport system station 733, 833 loaded with passengers, which then the commuter car may be disengaged from the driving unit and navigated to the docking station by the omnidirectional wheel transporter. Once docked, the passengers may exit the commuter car and, for example, wait for the omnidirectional cargo transporter to arrive with their belongings. While this is occurring, a second loaded commuter car may engage the driving unit to travel to the next destination. Moreover, the monorail track could be anywhere near the transport system station 733, 833 because the omnidirectional wheel transporter may move the commuter car into the correct position underneath the monorail track. The high-speed mass transport system may be able to have stations in city centers because of the suspended track. The suspended track and the installed pillars allow for the system to be above the city's infrastructure with only the transport system station 733, 833 being ground level.

Additionally, the commuter car of high-speed mass transport system may be loaded and unloaded separately from where the commuter car is attached to the driving unit. Once the monorail car reaches the station 751, 851, the omnidirectional wheel transporter ("omnidirectional commuter transporter") may engage the commuter car 702, 802 to release the commuter car 702, 802 from the driving unit. After the commuter car 702, 802 is separated from the driving unit, the omnidirectional commuter transporter 702, 802 may transport the commuter car to the docking station 729.

Again, the high-speed mass transportation has a monorail track and a station disposed along a travel path, wherein the monorail track (not shown) intersects the station. The high-speed mass transportation system also having a monorail car with a driving unit adapted to suspend from the monorail track and a commuter car having a main cabin for housing passengers and selectively attached to the driving unit is provided. Additionally, the high-speed mass transportation system has an omnidirectional wheel transporter being adapted to selectively raise and lower to engage the commuter car, thus allowing the commuter car to detach from and reattach to the driving unit. An advantage of the high-speed mass transportation system being high-speed transportation and increased efficiency due to the commuter car separating from the driving unit. The separation of the commuter car from the driving unit allows commuter cars to be loaded and unloaded without interrupting other commuter car travel.

Figure 9:
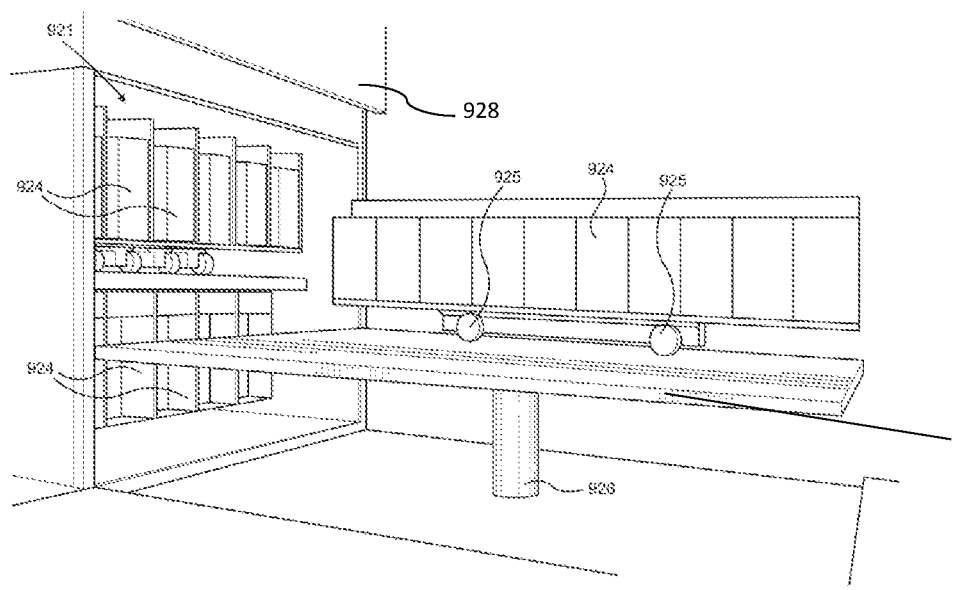
FIG. 9 illustrates the perspective view of a cargo bay with an omnidirectional cargo transporter, according to an aspect.

FIG. 9 illustrates the perspective view of the cargo bay 921 with the omnidirectional cargo transporter 924, according to an aspect. The cargo bay 921 may be the bottom portion of the commuter car and may have multiple levels to house the omnidirectional cargo transporters 924. As shown, the cargo bay 921 may have a cargo bay door 928, for example, that slides upwards to gain access to the cargo bay 921. A hydraulic elevator 926 may be used to transfer the omnidirectional cargo transporters 924 to the appropriate level of the cargo bay 921. Additionally, the individual omnidirectional cargo transporters 924 may allow for the cargo to go in separate directions depending on their desired selected destinations. Thus, an omnidirectional cargo transporter 924 may contain passengers' personal items and would go to a passenger pick up zone, while another omnidirectional cargo transporter 924 may have commercial packages for transportation and would be led to parcel delivery trucks for further transportation. These omnidirectional cargo transporters 924 may have attached omnidirectional wheels 925 allowing the transporters 924 to move omnidirectionally. The omnidirectional wheels 925 may also allow the omnidirectional cargo transporter 924 to travel in a direction, but also may allow the transporter to easily travel in the perpendicular direction without having to preform numerous maneuvers to begin to travel in that direction.

Figure 10:
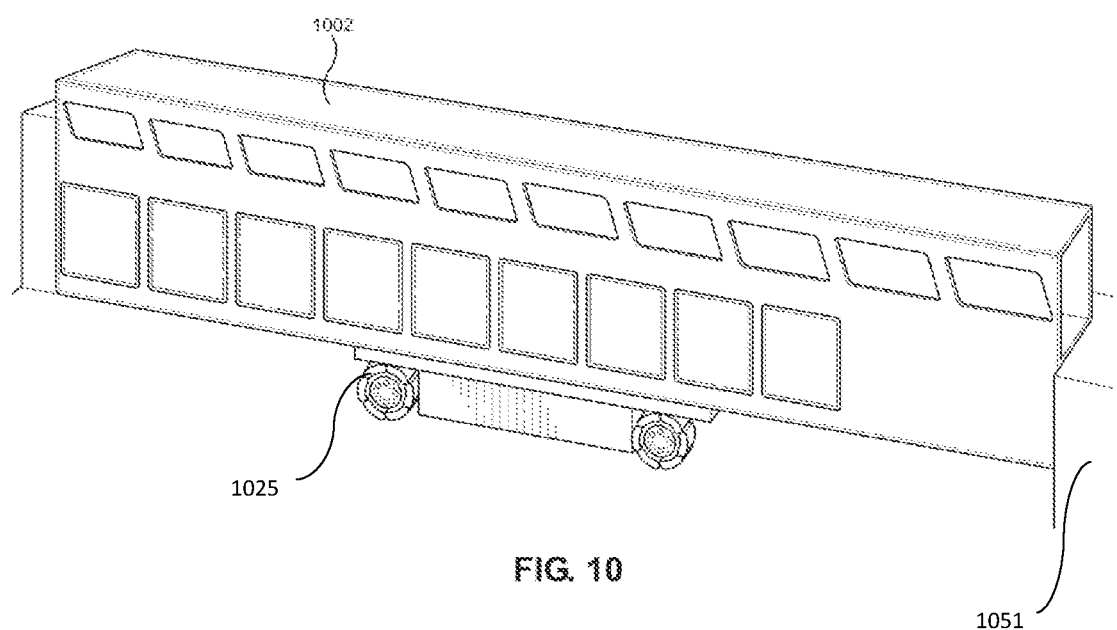
FIG. 10 illustrates the perspective view of a docked commuter car, according to an aspect.

FIG. 10 illustrates the perspective view of the docked commuter car, according to an aspect. As shown in FIG. 10, the commuter car 1002 may be docked in a duel leveled station. This may allow for both the passengers and the cargo to be unloaded at the same time. For example, the dual level docking station allows for cargo to be unloaded without interfering with passengers departing from the commuter car 1002. Moreover, passengers are not waiting for their personal belongings while blocking the access to the commuter car. Similarly, as an airplane baggage claim, this allows the commuter car to begin the loading process for the next set of departing passengers. Thus, saving time for the departing process, and it is an overall more time efficient system due to these measures. The dual leveled docking station 1051 further allows for more access to the cargo bays. For example, instead of having to wait for the entire cargo bay to be unloaded through a single exit, cargo may be unloaded from multiple exits along the side of the commuter car. Additionally, one of the cargo doors 928 may have the personal belongings to the passengers on that particular commuter car 1002, while the other cargo doors 928 may have the parcels for delivery services. Thus, the cargo may be simultaneously unloaded and dispersed to their proper destination.

Figure 11:
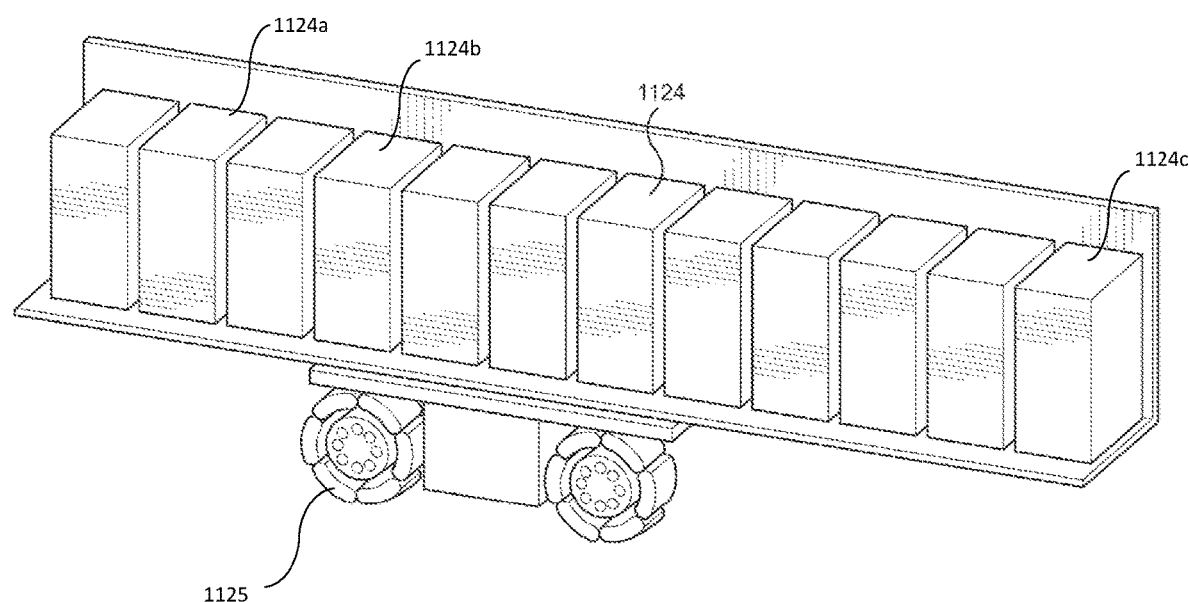
FIG. 11 illustrates the perspective view of an omnidirectional cargo transporter, according to an aspect.

FIG. 11 illustrates the perspective view of the omnidirectional cargo transporter 1124, according to an aspect. The omnidirectional cargo transporter 1124 may also be divided into sections, which would allow each passenger to have access to an individual cargo portion for their traveling needs. For example, each cargo section 1124a-c may correspond with a different passenger, further allowing for time efficient travel due to the passenger knowing exactly where their belongings are. In an example, the cargo section 1124a-c may correspond to a passenger and may only open for that specific passenger via, for example, a key or code. Additionally, the omnidirectional cargo transporter 1124 may be stored in the cargo bay of the commuter car.

Figure 12:
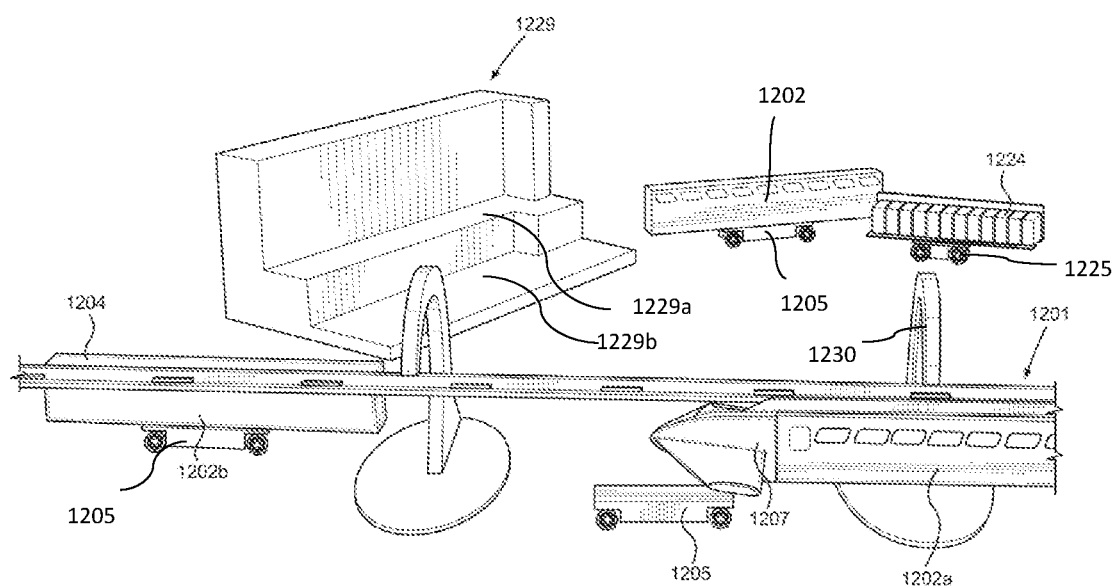
FIG. 12 illustrates the perspective view of an incoming monorail car, according to an aspect.

FIG. 12 illustrates the perspective view of an incoming monorail car, according to an aspect. As shown in FIG. 12, the incoming monorail car 1201 is engaged with the monorail track 1204 with waiting commuter cars 1202*b* nearby. The driving unit 1207 of the monorail car 1202 may me coupled to the monorail track 1204 with a magnetic levitation system. As shown, the omnidirectional cargo transporter 1224 may also be waiting nearby for the next set of passengers' luggage. Also shown, the omnidirectional wheel transporter 1205 may be on standby for the incoming commuter car 1202*a*. For example, the omnidirectional wheel transporter 1205 may be positioned near the monorail track 1204, where the incoming monorail car may stop to unload the loaded commuter car 1202*b*. The modular aspect of the monorail car system allows for more time efficient stops because passengers do not need to wait to board after the prior group of passengers have disembarked, such as compared to a train or a bus where each group must wait for the vehicle to unload prior to boarding. As an example, this system may decrease loading time by half because of the commuter cars 1202 being separate from the driving unit. This also improves overall travel efficiency due to the commuter cars 1202 being ready for travel. Another issue with other high-speed transportation systems is the time lost while loading and unloading passengers and as mention this may reduce that time by half.

Figure 13:
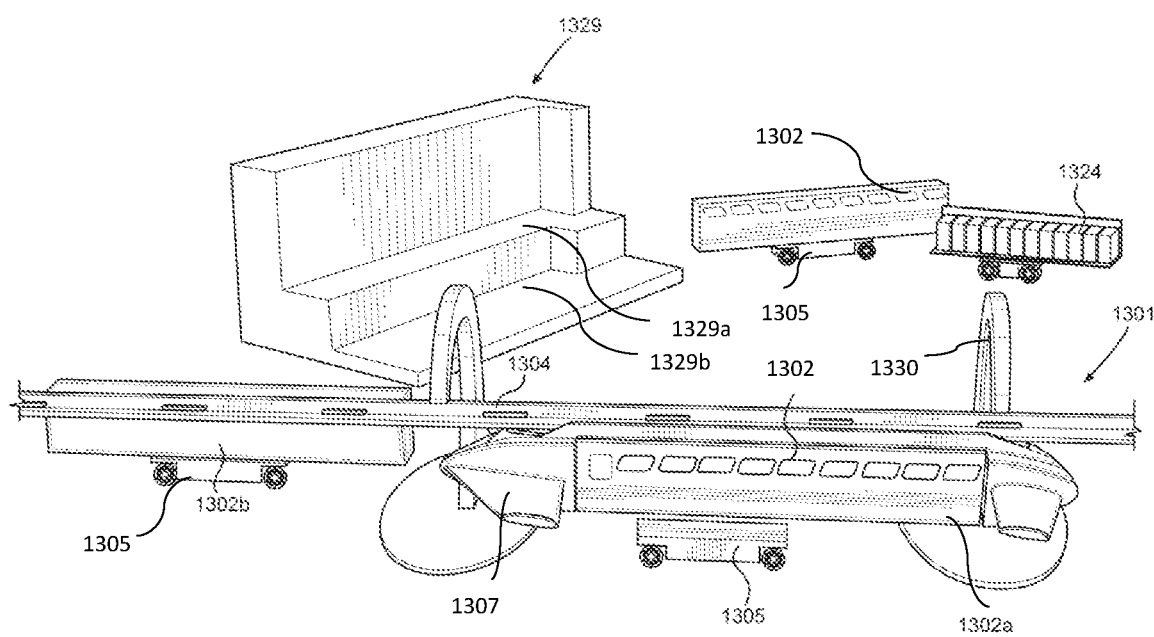
FIG. 13 illustrates the perspective view of an incoming monorail car ready for the commuter car to be disengaged, according to an aspect.
Figure 14:
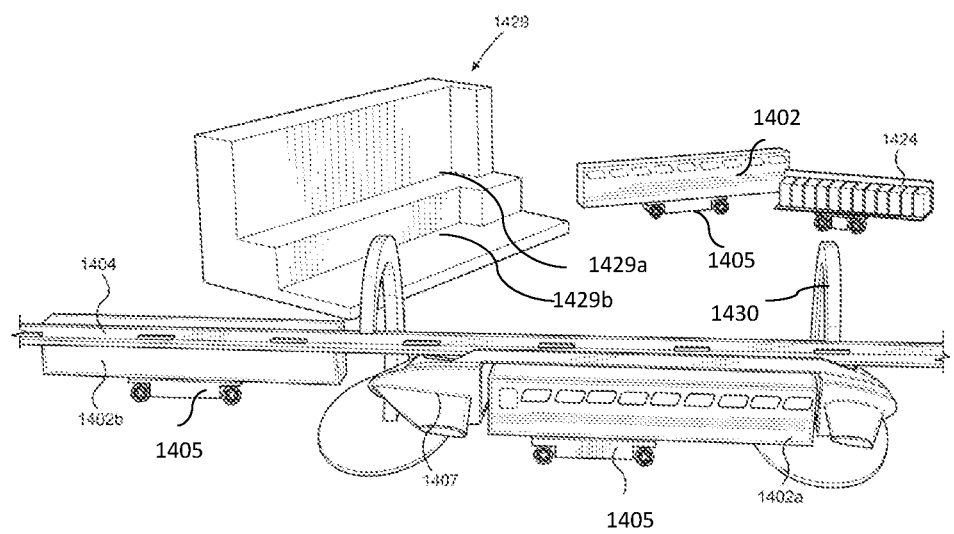
FIG. 14 illustrates the perspective view of a disengaged incoming commuter car, according to an aspect.

FIG. 13 illustrates the perspective view of an incoming monorail car 1301 ready for a commuter car to be disengaged, according to an aspect. Shown in FIG. 13, the incoming monorail car 1301 may come to a complete stop to allow the omnidirectional wheel transporter 1305 to lift and engage with the incoming commuter car 1302*a*. While FIG. 14 illustrates the perspective view of a disengaged incoming commuter car 1402*a*, according to an aspect. Following the complete stop, shown in FIG. 14, and once the omnidirectional wheel transporter 1305 is engaged with the incoming commuter car 1302*a*, the incoming commuter car 1302*a* would disengage from the driving unit of the monorail car. The omnidirectional wheel transporter 1305 may then lower down to surface level and transport the commuter car 1302*a* to the docking station. As described herein, the omnidirectional wheel transporter 1305 may raise to meet the commuter car 1302*a*, 1502*a*, 1602*a*, 1702*a*, 1802*a*, 1902*a* and couple with the underside of the commuter car. Once the omnidirectional wheel transporter 1405 is attached to the commuter car 1402*a*, as shown in FIG. 14, the omnidirectional wheel transporter 1405 may transport the loaded commuter car 1402*a* to the docking station 1429 for unloading.

Figure 15:
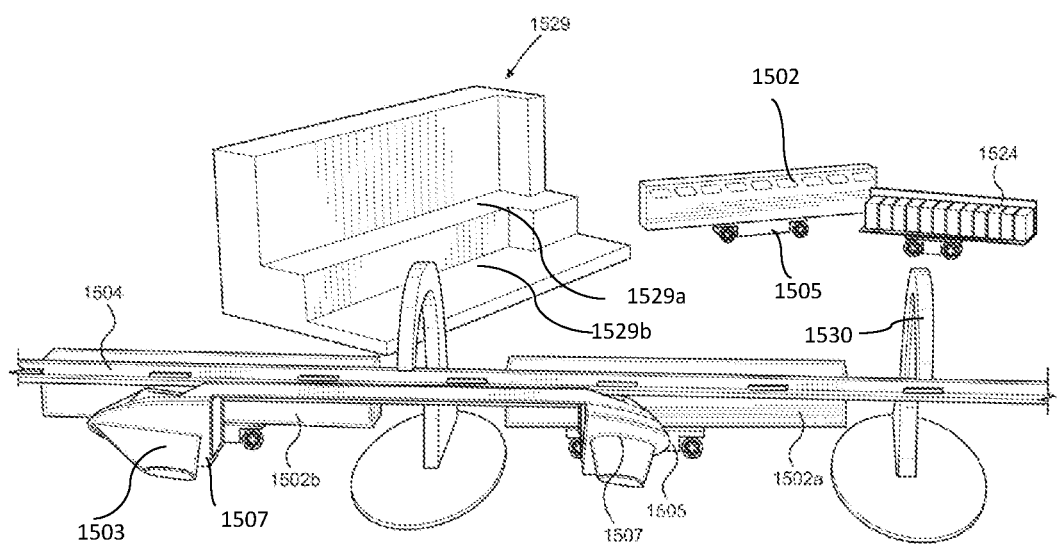
FIG. 15 illustrates the perspective view of a driving unit positioning to engage an outgoing commuter car, according to an aspect.
Figure 16:
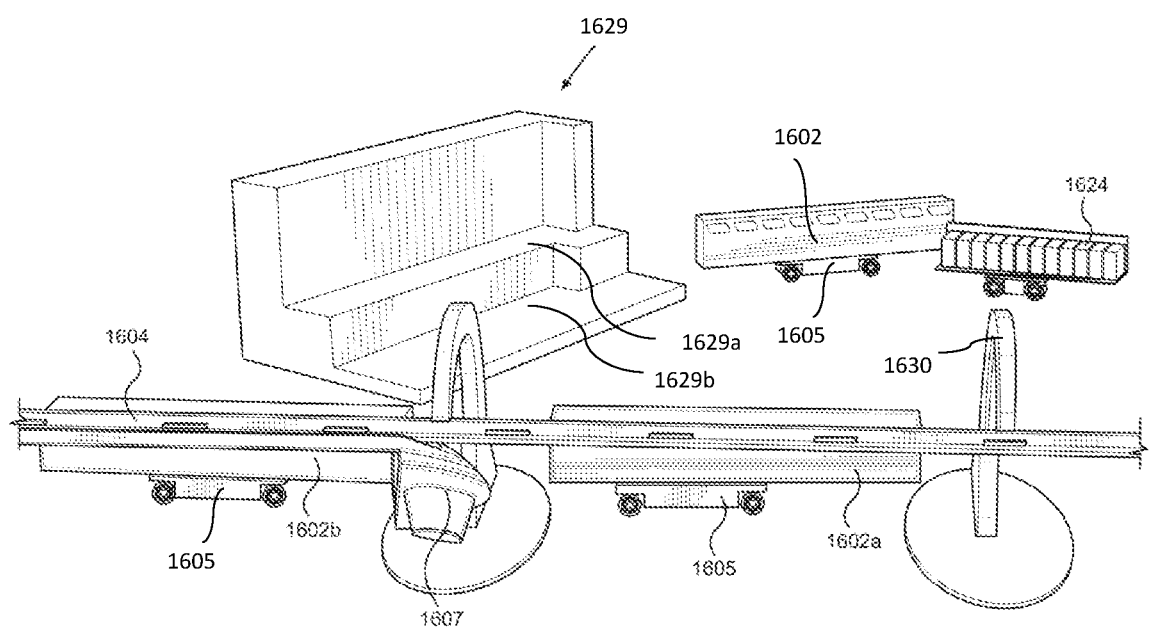
FIG. 16 illustrates the perspective view of a driving unit ready for the outgoing commuter car to be engaged, according to an aspect.
Figure 17:
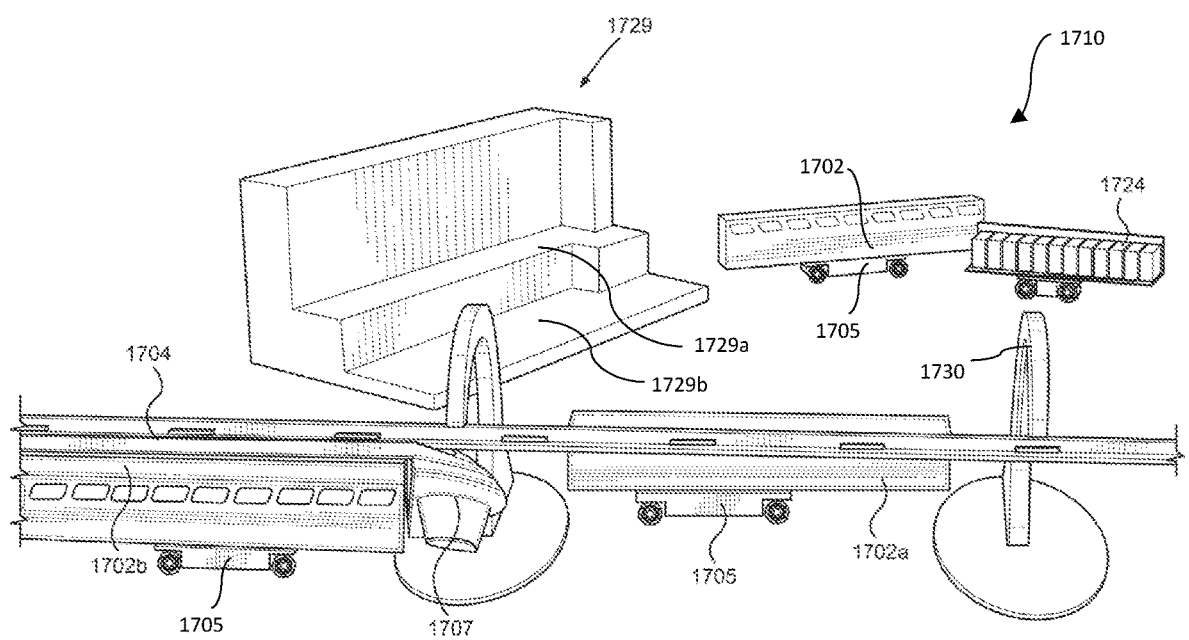
FIG. 17 illustrates the perspective view of an engaged outgoing commuter car, according to an aspect.

FIG. 15 illustrates the perspective view of a driving unit 1507 positioning to engage an outgoing commuter car 1502*b*, according to an aspect. FIG. 15 illustrates the driving unit 1507 moving from the initial stopped position to the position where the driving unit may engage with a second commuter car 1502*b*. For example, driving unit 1507 may move forward the length of a commuter car 1502 to provide a faster travel time. While FIG. 16 illustrates the perspective view of a driving unit ready for the outgoing commuter car to be engaged, according to an aspect. As shown in FIG. 16, the driving unit 1607 moved forward to engage with a second loaded commuter car 1602*b*. Furthermore, FIG. 17 illustrates the perspective view of an engaged outgoing commuter car, according to an aspect. While FIG. 17 shows the second commuter car 1702*b* being positioned under the driving unit 1707.

As shown, the high-speed mass transportation system 1710 may have modular parts for the driving mechanism ("driving unit") 1207, passenger portion ("commuter car") 1702*a*, and cargo containers. The high-speed mass transportation vehicle being modular for more time efficient passenger and cargo loading and unloading. The modular nature of the monorail car allows the propulsion unit 1707 to always stay connected to the overhead monorail, while the commuter car disconnects and docks into the docking station for loading and unloading. Thus, an advantage is more efficient transportation because the propulsion unit does not wait for passenger loading and unloading. Again, as an example, the high-speed mass transportation system may be autonomous and having omnidirectional wheels 1125, 1025 for the commuter car and the omnidirectional cargo transporter 1724. The monorail car of the mass transportation system is autonomous and has omnidirectional capabilities, by using omnidirectional wheels, for guiding the commuter car to the correct docking station. The commuter car also contains cargo units, which are also autonomous and have omnidirectional capabilities by using omnidirectional wheels. The omnidirectional wheels for both the commuter car and the omnidirectional cargo transporter permit horizontal movement which reduces space needed and can turn to unload when needed. Thus, an advantage is more efficient transportation because the system may always depart and arrive at the scheduled time. Another advantage is the units having the ability to navigate the docking station 1729 with ease autonomously. As described herein, the omnidirectional wheel transporter has omnidirectional wheels, thus the omnidirectional wheel transporter may be able to navigate tight turns.

Figure 18:
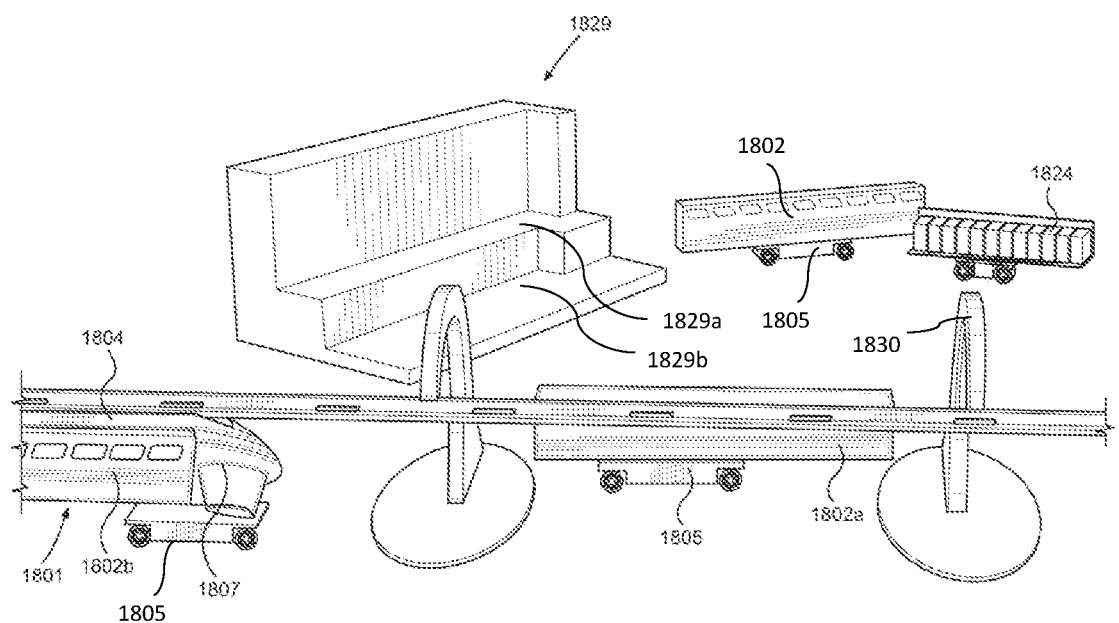
FIG. 18 illustrates the perspective view of an outgoing monorail car, according to an aspect.

FIG. 18 illustrates the perspective view of an outgoing monorail car 1801, according to an aspect. Shown in FIG. 18, the second loaded commuter car 1802*b* has been fully engaged with the driving unit 1807 and is leaving the station 1833. For example, it may only take 10-minutes to decouple and recouple with the commuter cars, which means the system may maintain high-speed travel times without the hinderance passenger loading. Typical in-route trains must stop at large cities for passenger unloading and loading, which diminishes the high-speed advantages because of these frequent stops. When the standard trains arrive at their final destination, they are often carrying in excess of 1000 passengers per train, all arriving in a train station far from their desired final destination. Having the commuter car 1802 separate from the driving unit 1807 may alleviate these travel delay issues because it may then transport the passenger into the densely populated areas.

Figure 19:
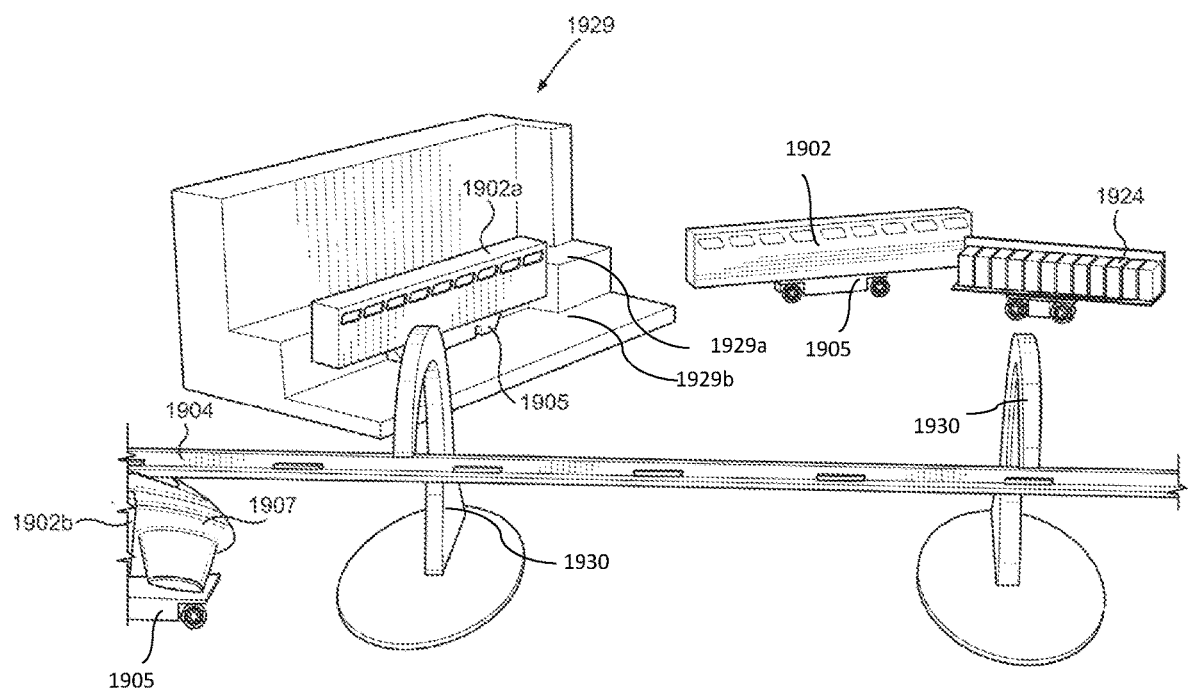
FIG. 19 illustrates the perspective view of a docked incoming commuter car, according to an aspect.

FIG. 19 illustrates the perspective view of a docked incoming commuter car, according to an aspect. FIG. 19 shows the incoming commuter car 1902*a* at the docking station 1929 ready to unload passengers, while the second loaded commuter car 1902*b* heads to the next destination. In an example, the high-speed mass transport system may also be powered by a self-sustaining solar panel farm. Having the system be powered by solar panels allow for the system to be eco-friendlier. It may also prevent fossil fuel pollution because of the number of passengers that may choose this mode of transportation over other options and are not using personal vehicles that produce more pollution.

As described herein, the high-speed mass transport system 1710 may have a plurality of pylons 1230 (also shown and referenced as 1330, 1430, 1530, 1630, 1730, 1830, 1930) disposed on a travel path between a plurality of destinations. The monorail track 1204 (also shown and referenced as 1304, 1404, 1504, 1604, 1704, 1804, 1904) being attached to and suspended from the plurality of pylons and being positioned along the travel path. The plurality of stations 1229 (also shown and referenced as 1329, 1429, 1529, 1629, 1729, 1829, 1929) being disposed along the travel path may be dual leveled, as described herein. For example, the stations 1229, 1329, 1429, 1529, 1629, 1729, 1829, 1929) may have a first level 1229*a* (also shown and referenced as 1329*a*, 1329*a*, 1429*a*, 1529*a*, 1629*a*, 1729*a*, 1829*a*, 1929*a*) for passengers to exit from the commuter car 1202 and a second level 1229*b* (also shown and referenced as 1329*b*, 1329*b*, 1429*b*, 1529*b*, 1629*b*, 1729*b*, 1829*b*, 1929*b*), for the cargo to be removed from the commuter car 1202 (also shown and referenced as 1302, 1402, 1502, 1602, 1702, 1802, 1902). The monorail car 1201 having a driving unit 1207 (also shown and referenced as 1302, 1402, 1502, 1602, 1702, 1802, 1902) suspended from the monorail track 104 and adapted to propel using magnetic levitation and a commuter car 1202 (also shown and referenced as 1302, 1402, 1502, 1602, 1702, 1802, 1902) selectively attached to the driving unit 1207 is described herein.

The commuter car 1202 may have a cargo compartment having an omnidirectional cargo transporter 1224 (also shown and referenced as 1324, 1424, 1124, 1624, 1724, 1824, 1924) adapted to transport passenger cargo. The monorail car 1201 may also have a pair of exterior wings ("wings")1203 (also shown and referenced as 1303, 1403, 1503) disposed on an exterior surface of the monorail car. Furthermore, the system 1210 may have an omnidirectional wheel transporter 1205 (also shown and referenced as 1305, 1405, 1505, 1605, 1705, 1805, 1905) being adapted to selectively raise and lower to engage the commuter car 1202, thus allowing the commuter car 1202 to detach from and reattach to the driving unit 1207 (also shown and referenced as 1307, 1407, 1507, 1607, 1707, 1807, 1907). Thus, allowing the monorail car to transport the passengers from each of the plurality of stations. Moreover, the high-speed mass transport system 1710 may be autonomous to further allow for time efficient high-speed mass transportation.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Additional definitions for specific terms to this application? If yes, define here . . . .

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A high-speed mass transport system comprising:
   a plurality of pylons disposed on a travel path between a plurality of destinations;
   a monorail track attached to the plurality of pylons, the monorail track positioned along the travel path, and the monorail track suspended from the plurality of pylons;
   a plurality of stations disposed along the travel path, wherein the monorail track intersects each of plurality of stations;
   a monorail car having:
   a driving unit suspended from the monorail track and adapted to propel using magnetic levitation;

a commuter car selectively attached to the driving unit and having:
  a cargo compartment having an omnidirectional cargo transporter adapted to transport passenger cargo to a station cargo bay; and
  a main cabin being adapted to house passengers;
a pair of exterior wings disposed on an exterior surface of the monorail car;
an omnidirectional wheel transporter being adapted to selectively raise and lower to engage the commuter car, thus allowing the commuter car to detach from and reattach to the driving unit;
the monorail car being adapted to transport the passengers from each of the plurality of stations;
the high-speed mass transport system being autonomous.

2. The system of claim 1, wherein the main cabin has a restroom.

3. The system of claim 1, wherein each of the plurality of pylons are concrete "T" pylons.

4. The system of claim 1, wherein the driving unit has an aerodynamic nose coupled to an exterior front end.

5. The system of claim 1, wherein each of the plurality of stations have a duel leveled docking platform.

6. The system of claim 1, wherein the omnidirectional wheel transporter has omnidirectional wheels, thus the omnidirectional wheel transporter being adapted to navigate tight turns.

7. The system of claim 1, wherein the cargo bay of commuter car is disposed below the main cabin.

8. A high-speed mass transport system comprising:
a monorail track disposed along a travel path;
a station disposed along the travel path, wherein the monorail track intersects the station;
a monorail car having:
  a driving unit adapted to suspend from the monorail track;
  a commuter car having a main cabin for housing passengers and selectively attached to the driving unit;
an omnidirectional wheel transporter being adapted to selectively raise and lower to engage the commuter car, thus allowing the commuter car to detach from and reattach to the driving unit.

9. The system of claim 8, wherein the commuter car has a cargo compartment.

10. The system of claim 9, further comprising an omnidirectional cargo transporter adapted to transport passenger cargo to a station cargo bay.

11. The system of claim 10, wherein the omnidirectional cargo transporter has omnidirectional wheels.

12. The system of claim 8, wherein the driving unit is adapted to propel on the monorail track using magnetic levitation.

13. The system of claim 8, wherein the station has a parking lot.

14. The system of claim 8, wherein the omnidirectional cargo transporter is adapted to stack on a second omnidirectional cargo transporter within the cargo bay.

15. A high-speed mass transport system comprising:
a monorail track disposed along a travel path;
a monorail car having:
  a driving unit suspended from the monorail track;
  a commuter car selectively attached to the driving unit;
an omnidirectional wheel transporter being adapted to selectively raise and lower to engage the commuter car, thus allowing the commuter car to detach from and reattach to the driving unit.

16. The system of claim 15, wherein the commuter car is adapted to transport one hundred passengers.

17. The system of claim 15, wherein the driving unit is adapted to propel on the monorail track using an air cushion.

18. The system of claim 15, wherein the monorail car is adapted to be autonomous.

* * * * *